(12) United States Patent
Solfrank

(10) Patent No.: US 8,276,561 B2
(45) Date of Patent: Oct. 2, 2012

(54) AXIAL THRUST WASHERS PARTIALLY FOR UNBALANCE SHAFTS

(75) Inventor: Peter Solfrank, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 390 days.

(21) Appl. No.: 12/435,687

(22) Filed: May 5, 2009

(65) Prior Publication Data

US 2009/0279822 A1    Nov. 12, 2009

(30) Foreign Application Priority Data

May 6, 2008  (DE) .................... 10 2008 022 307

(51) Int. Cl.
*F02B 75/06* (2006.01)
(52) U.S. Cl. ................ 123/192.2; 384/250; 464/180
(58) Field of Classification Search ............ 464/127, 464/178, 180; 384/250, 429–433, 457, 539, 384/585; 123/192.2; 411/517, 519
See application file for complete search history.

(56) References Cited

U.S. PATENT DOCUMENTS

| | | | | |
|---|---|---|---|---|
| 1,489,185 A | * | 4/1924 | Wenciker | 384/250 |
| 4,770,547 A | * | 9/1988 | New | 384/429 |
| 5,147,144 A | * | 9/1992 | Kasai | 384/585 X |
| 6,305,339 B1 | * | 10/2001 | Iwata et al. | 123/192.2 |
| 6,835,139 B2 | * | 12/2004 | Schultze | 464/127 |

FOREIGN PATENT DOCUMENTS

EP          1 081 410 A1    3/2001

* cited by examiner

*Primary Examiner* — Gregory Binda
(74) *Attorney, Agent, or Firm* — Volpe and Koenig, P.C.

(57) ABSTRACT

Axial thrust washers are provided in the axial contact region of the bearing raceway of an unbalance shaft. The axial thrust washers do not extend beyond 360° in the circumferential direction, but extend only over a little more than the unbalance masses which extend in this region. The end sections of the axial thrust washers are bent over so that they are supported on the prominent unbalance masses, and form a funnel-like entry region for the rolling elements or for a cage of the rolling bearing which houses the rolling elements.

8 Claims, 3 Drawing Sheets

AXIAL THRUST WASHERS PARTIALLY FOR UNBALANCE SHAFTS

This application claims the priority of DE 10 2008 022 307.7 filed May 6, 2008, which is incorporated by reference herein.

BACKGROUND OF THE INVENTION

Field of the Invention

The invention refers in general to axial thrust washers for unbalance shafts.

During the operation of a piston, a dynamic force is transmitted by means of a connecting rod to the crankshaft. In this way, the oscillating movement of the piston is converted into a rotational movement. As a result of the reciprocating movement of the piston and connecting rod, and also as a result of the irregular transmission behavior of the crankgear, inertia forces occur which are supported in engine bearings and subject adjacent structures to vibration excitations. The inertia forces of the linearly moved parts of the crankgear, that is to say the oscillating masses, can be approximately represented by a formula which is based on a series expansion in which inertia forces of the first and second order are defined.

The rotating masses of the crankgear can be compensated by means of counterweights on the crankshaft.

Oscillating inertia forces of the first and second order can be avoided or reduced in the case of multi-cylinder engines by means of a skilled arrangement of the cylinders. In the case of in-line engines with fewer than six cylinders and V-engines with fewer than eight cylinders, balance shafts are often used. In order to balance inertia forces of the second order, at least six cylinders are required in the case of the in-line engine, or eight cylinders in the case of the V-engine, or balance shafts upon which corresponding compensating unbalances rotate at double crankshaft speed.

Balance shafts, therefore, serve to reduce or to eliminate the free inertia forces of a reciprocating piston engine in order to reduce operating noise and vibrations. The unbalances or eccentric weights which are fastened on the balance shaft counteract the inertia forces which are created by the crankgear. The balance shafts are synchronously driven by the crankshaft by means of toothed wheels, chains, or toothed belts. Depending upon the type of engine construction, one or two balance shafts are used in most cases.

The construction of balance shafts is subject to the established principle of providing a mass arrangement between two bearing points, the center of gravity of which arrangement does not lie on the rotational axis of the balance shaft, as a result of which a compensating unbalance is created. Such a balance shaft follows from EP 1 081 410 B1. As illustrated in FIG. 14 of this document, the largest unbalance radius is greater than the radius of the bearing journal which is directly adjacent to the unbalance masses. Although the bearing journal forms part of a plain bearing, it is also conceivable to support such a balance shaft in the internal combustion engine by means of a rolling bearing, and especially by means of a needle bearing, upon the bearing journal which then serves as a rolling element raceway. Providing, however, no further constructional measures are taken in this case, this can lead to a premature component wear since the bearing journal is axially delimited only on a partial circumference by means of the unbalance masses which radially project there, and a cage which accommodates the rolling elements, or the rolling elements during their rotation, can run against an edge which is created as a result of the unbalance mass which locally projects with regard to the bearing journal.

SUMMARY OF THE INVENTION

By means of the invention, a possibility is created in the case of an unbalance shaft of avoiding, or at least reducing, the wear of the bearing components.

This object is achieved by means of the subject of a respective independent claim. Further preferred embodiments are described in the dependent claims, respectively.

With the solution according to the invention, axial thrust washers are generally fastened on the shaft in the axial contact region of the bearing and do not extend over 360° in the circumferential direction but only over little more than the unbalance masses which are prominent in this region. The ends of such ring sections are bent over in such a way that they form a funnel-like entry region for the rolling elements, or for a cage of the rolling bearing which accommodates the rolling elements, and which during operation are supported on the prominent unbalance masses against centrifugal force.

According to another embodiment, the axial thrust washers on the entire section, or on a possibly even discontinuous section, are fixed in the axial direction in a groove which is formed in the shaft.

In addition to the achieving of the aforementioned object, a reliable positioning of the axial thrust washers both in the radial as well as in the axial direction of the shaft can therefore be ensured.

BRIEF DESCRIPTION OF THE DRAWINGS

The invention is described based on preferred embodiments with reference to the attached drawings. In the drawings.

DETAILED DESCRIPTION OF THE INVENTION

Figure 1:
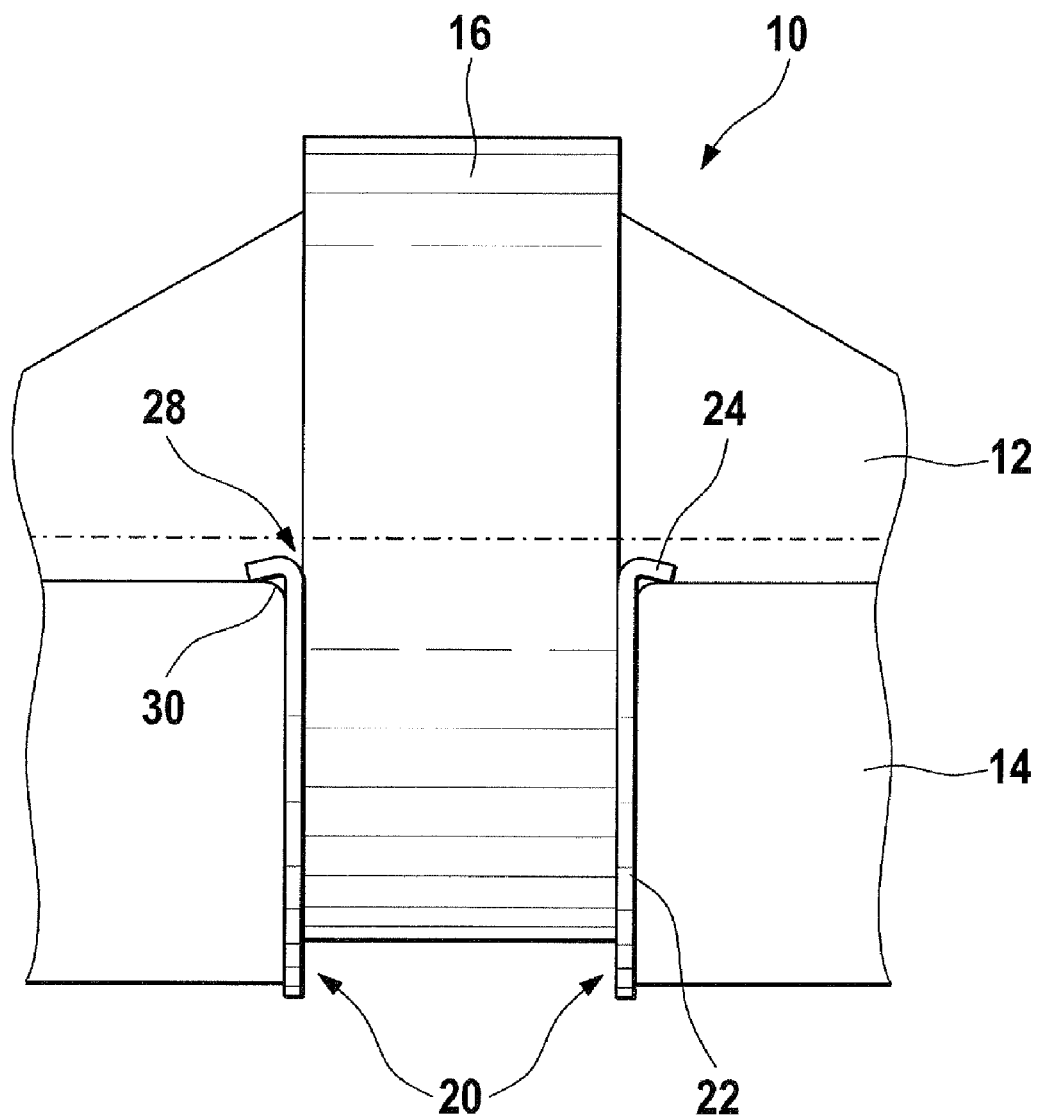
FIG. 1 shows a side view of a bearing point of an unbalance shaft, with axial thrust washers according to a first embodiment of the invention.

FIG. 1 shows a side view of a section of an unbalance shaft 10. The section of the unbalance shaft 10 has a bearing raceway 16 which extends concentrically to the axis X of the unbalance shaft over the entire circumference of the unbalance shaft. Masses 14, which form the unbalance of the unbalance shaft, are arranged laterally in the axial direction next to the bearing raceway 16. The unbalance masses 14 are arranged asymmetrically relative to the axis X of the unbalance shaft. In FIG. 1, the largest radius of the unbalance masses 14 is arranged below the axis of the unbalance shaft 10. With the designation 12, a region is identified which forms a transition between the bearing raceway 16 and the unbalance masses 14. The transition region 12 for example can be formed in the form of a reinforcing rib. In the radial direction, therefore, the material of the unbalance shaft 10 recedes from the of the unbalance masses 14 in the direction of the transition region 12. In this way, a shoulder, with an edge 30 which projects with regard to the bearing raceway 16, is created for the bearing raceway 16 on the transition region between the unbalance mass 14 and the material of the transition region 12. An unbalance shaft 10 which is formed in such a way for example can be produced via forming processes.

Furthermore, two axial thrust washers 20 are shown in FIG. 1. Each have a ring section 22 and an end section 24 in each case. The ring section 22 is a segment of a ring. In other words, the ring section 22 extends only over a partial circumference of the unbalance shaft 10. In the illustrated embodiments, the ring section 22 extends less than 180° about the center axis X, the center axis of the ring section and the circumference of the bearing raceway 16. In FIG. 1, the outwards pointing edge of the axial thrust washer 20 is seen. The axial thrust washer 20 has a smaller extent in the axial direction than in the radial direction. The end section 24 is bent over in the axial direction in such a way that there is a smooth transition in the form of a bend radius with regard to the ring section 22. As result of this, a funnel-like entry region 28 is formed for the rolling elements, or for a cage of a rolling bearing, which is not shown, which accommodates the rolling elements, so that a stopping of the rolling elements or of the cage against the edge 30 is prevented.

As a result of the bending over of the end section 24 of the axial thrust washer 20, the possibility is also created of the axial thrust washer 20 being supported on one of the unbalance masses 14, which is are formed laterally to the bearing raceway 16 so that the axial thrust washer 20, during a rotation of the unbalance shaft 10, does not lift off the unbalance shaft due to the centrifugal forces. This support also ensures that the rolling elements, which roll on the bearing raceway 16, or the cage, during contact with the axial thrust washer 20, do not carry this along in the circumferential direction, i.e. the rolling elements, which roll on the bearing raceway 16, and the cage which accommodates these, are moving in the upper region (in FIG. 1) without axial guiding and in the lower region enter a channel which is formed by the unbalance masses 14 which are arranged laterally to the bearing raceway 16. Wear of the bearing components is now reduced by the wall of the unbalance masses 14, and especially the edges 30, being covered by the axial thrust washers 20.

During production and installation of the axial thrust washers 20, it is conceivable that these on the one hand are first bent over at their end sections 24 in order to then be hooked/mounted on the unbalance masses 14. On the other hand, it is conceivable that an axial thrust washer, which is prefabricated in a flat manner as a ring section, is positioned on the unbalance shaft 10 and the end sections 24 are only then bent over. Depending upon the design of the unbalance shaft 10, it may come to a preferred sequence of assembly of the bearing components and also of the axial thrust washers 20 during installation. Consequently, an instruction would then also be given with regard to the first or second production/installation variant.

Figure 2:
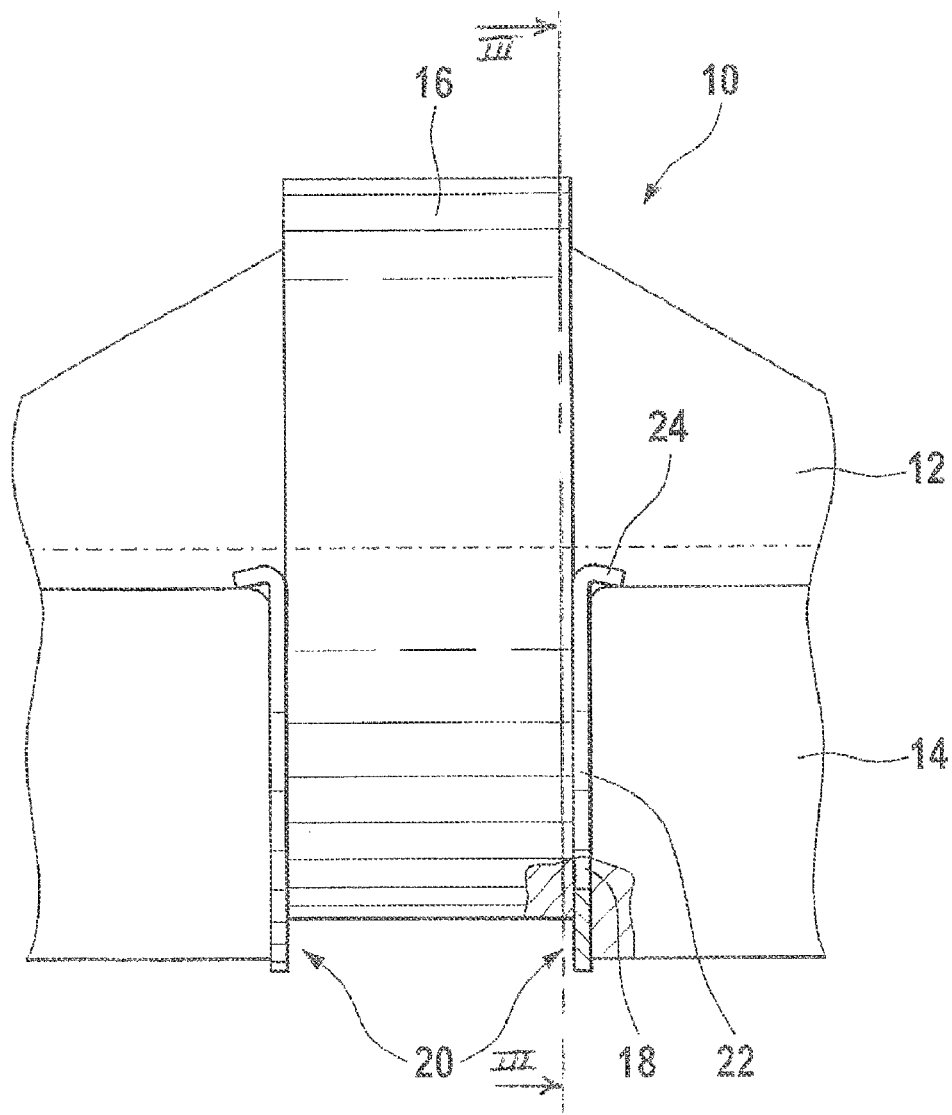
FIG. 2 shows a partly sectioned side view of a bearing point of an unbalance shaft, with axial thrust washers according a second embodiment of the invention.
Figure 3:
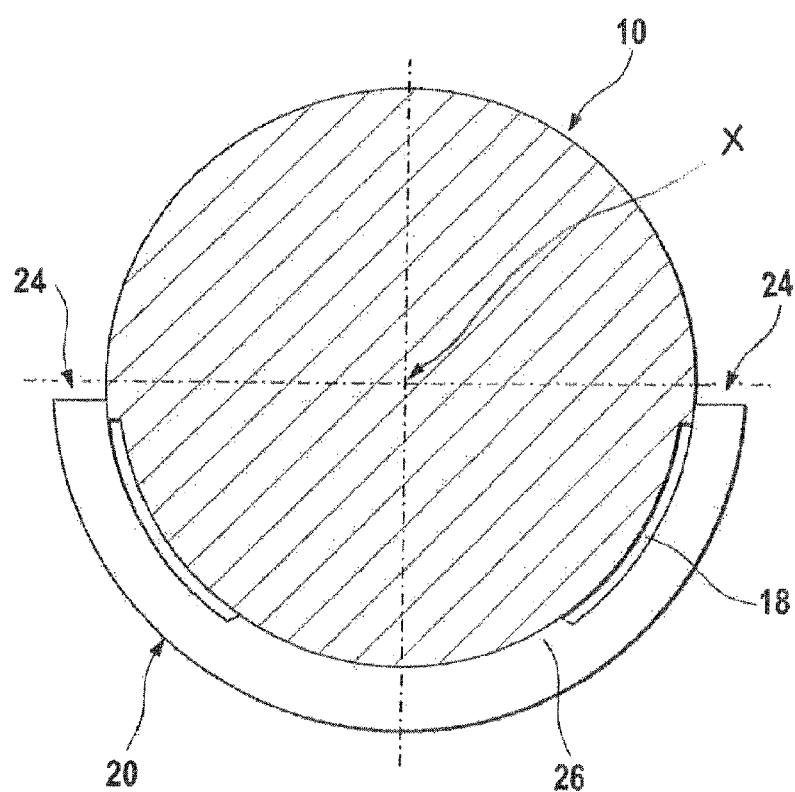
FIG. 3 shows a view in the axial direction of an axial thrust washer according to the second embodiment of the invention, along the line III-III in FIG. 2.

In FIGS. 2 and 3, a second embodiment according to the invention is shown. With regard to the essential features, this embodiment does not differ from the first embodiment which is described above. Also in this case, the axial thrust washers 20 are formed from ring sections 22 and at least one bent-over end section 24. This end section also ensures that support of the axial thrust washer 20 on the unbalance mass 14 is possible, so that the axial thrust washer 20 does not become detached as a result of rotation of the unbalance shaft 10.

As an additional feature, the axial thrust washer 20 according to the second embodiment has a projection 26. This projection is formed radially inwards in a center section on the inside circumference of the axial thrust washer 20. On account of the projection 26, use of this axial thrust washer 20 is only possible, if at the same time a groove 18, which is suitable for accommodating the projection 26, is formed in the unbalance shaft 10 between the unbalance mass 14 and the bearing raceway 16. According to FIGS. 2 and 3, the groove 18 extends only on a partial circumference of the unbalance shaft 10. The advantage of the axial thrust washer 20 according to the second embodiment lies in the fact that the axial thrust washer 20 is also secured in the axial direction on account of the engagement of the projection 26 in the groove 18.

Alternatively, it is possible for a plurality of projections 26 to be formed along the inside circumference of the axial thrust washer 20 and to engage in a corresponding groove of the unbalance shaft 10. Furthermore, the inside circumference of the axial thrust washer 20 can altogether have a smaller radius than the radius of the adjacent bearing raceway 16 so that the axial thrust washer 20 engages in a groove along its entire length, when it is installed.

Installation of the axial thrust washer 20 according to the second embodiment can also be carried out via two variants. Firstly, the axial thrust washer 20 can be manufactured with a bent-over end section 24 and then be pushed onto the unbalance shaft 10. In so doing, it is to be taken into consideration that the at least one bent-over end section 24 must have a certain elasticity so that the axial thrust washer 20 can be positioned completely. For this purpose, the bent-over end section 24 is bent towards the bearing raceway 16 until the projection 26 engages in the groove 18 and as a result the bent-over end section 24 projects over the edge of the unbalance mass 14 and snaps back again into the desired position.

According to a second installation variant, the axial thrust washer 20, which has been prefabricated in a merely flat manner, i.e. the end section 24 has not yet been bent over, can be positioned on the unbalance shaft 10 so that the projection 26 engages in the groove 18. Only in this position is the at least one end section 24 bent over in such a way that the desired supporting on the unbalance mass 14 is arrived at. Ultimately, it is the aim in the case of the two variants that the axial thrust washer 20 covers only a partial circumference of the unbalance shaft 10, and that the axial thrust washer 20 is locked or secured in its position both in the radial direction and in the axial direction.

It is noted that the embodiments which are described here are only exemplary. A multiplicity of variations are possible, especially with regard to the shape and design of the unbalance shaft 10 and its unbalance mass 14. Another configuration of the axial thrust washers 20 is also conceivable with regard to their dimensions in the radial and axial directions without deviating from the inventive idea.

Axial thrust washers 20 according to the two described embodiments are preferably fitted on an unbalance shaft 10 adjacent to a bearing raceway 16 of the unbalance shaft, under the assumption that the occurring forces/loads as seen from the unbalance shaft 10 always act in the same direction. In case the forces/loads act in a constant direction with regard to for example the casing, similarly configured axial thrust washers 20 can be used in principle, wherein these are then installed on the casing side.

As shown in the drawings, the end section 24 can be bent along a line parallel to a radius of the unbalanced shaft 10.

| List of Designations | |
| --- | --- |
| 10 | Unbalance shaft |
| 12 | Transition region |
| 14 | Unbalance masses |
| 16 | Bearing raceway |

-continued

List of Designations

| 18 | Groove |
| 20 | Axial thrust washer |
| 22 | Ring section |
| 24 | End section |
| 26 | Projection |
| 28 | Funnel-like entry region |
| 30 | Edge |

The invention claimed is:

1. An axial thrust washer for a rotating rolling bearing, comprising:
   a ring section extending less than 180° about a center axis of the ring section; and
   an end section, which is bent to extend axially from a plane of the ring section so as to form a funnel-like entry region for rolling elements or a cage of the rolling bearing which accommodates the rolling elements, wherein a projection is formed radially inwards along an inside circumference of the ring section.

2. The axial thrust washer according to claim 1, wherein two end sections of the axial thrust washer extend from the plane of the ring section.

3. The axial thrust washer according to claim 1, wherein the funnel-like entry region is formed by a transition radius between the end section and the ring section.

4. An axial thrust washer for guiding rolling elements or a cage of a rolling bearing, which accommodates the rolling elements, of an unbalanced shaft, the unbalanced shaft has an unbalance mass, which is arranged asymmetrically to a rotational axis of the unbalanced shaft, and a bearing raceway,
   wherein the axial thrust washer extends only over less than 180° of a circumference of the bearing raceway, and
   an end section of the axial thrust washer is bent over, forming a funnel-like entry region for the rolling elements or for the cage, in such a way that the end section can be supported on the unbalance mass away from the bearing raceway, wherein a groove is formed in the unbalance shaft between the unbalance mass and the bearing raceway, wherein a projection, which engages in the groove, is formed radially inwards along an inside circumference of the axial thrust washer.

5. The axial thrust washer according to claim 4, having two end sections that are bent over in such a way that the two end sections can be supported on the unbalance mass away from the bearing raceway.

6. An unbalanced shaft, comprising:
   an unbalance mass arranged asymmetrically to a rotational axis of the unbalanced shaft;
   a bearing raceway formed axially next to the unbalance mass; and
   an axial thrust washer, which extends only over a partial circumference of the bearing raceway, and has an end section that is bent over from a plane of the thrust washer so as to form a funnel-like entry region for rolling elements or for a cage for the rolling elements, in such a way that the end section of the axial thrust washer is supported on the unbalance mass away from the bearing raceway.

7. The unbalanced shaft according to claim 6, wherein two end sections of the axial thrust washer are bent over in such a way that the two end sections are supported on the unbalance mass away from the bearing raceway.

8. The unbalanced shaft according to claim 6, wherein the unbalanced shaft has a groove between the unbalance mass and the bearing raceway, and the axial thrust washer has a projection formed radially inwards along an inside circumference of the axial thrust washer so as to engage in the groove.

* * * * *